Patented Nov. 28, 1922.

1,436,894

UNITED STATES PATENT OFFICE.

PAUL I. MURRILL, OF PLAINFIELD, NEW JERSEY, ASSIGNOR TO R. T. VANDERBILT COMPANY, INC., OF NEW YORK, N. Y., A CORPORATION OF NEW YORK.

ACCELERATOR FOR VULCANIZING RUBBER.

No Drawing.   Application filed August 8, 1921.   Serial No. 490,686.

*To all whom it may concern:*

Be it known that I, PAUL I. MURRILL, a citizen of the United States, residing in Plainfield, county of Union, State of New Jersey, have invented certain new and useful Improvements in Accelerators for Vulcanizing Rubber.

The object of my invention is to produce an accelerator for use in the vulcanization of rubber and similar compounds which will not only greatly reduce the time required for vulcanization at the usual vulcanization temperatures and pressures, but which also may be used at lower temperatures or steam pressures than those ordinarily employed.

Other objects and advantages of my improved accelerator will be apparent in the following description of the method of making and using the same.

The preferred method for producing my improved accelerator is as follows:

(*a*) Dimethylamine (four molecules) is condensed with carbon bisulphide (two molecules) in an aqueous solution, resulting in the dimethyl ammonium salt of dimethyl-dithio-carbamic acid.

(*b*) The aqueous solution containing this product is then treated with a solution of zinc sulphate, $ZnSO_4$ (one molecule), or other soluble salt of zinc, resulting in the precipitation from said solution of the insoluble zinc salt of dimethyl-dithio-carbamic acid.

(*c*) The insoluble zinc precipitate suspended in said aqueous solution is then oxidized at ordinary atmospheric temperatures, preferably below 20° C. with the equivalent of one atom of oxygen in the form of an aqueous solution of the desired oxidizing agent. This produces a substance which constitutes my improved accelerator.

Among the oxidizing agents which may be used for this purpose, I would mention halogens such as iodine, bromine and chlorine, also hydrogen peroxide, peroxides of metals, and per-sulphates and similar oxidizing agents.

The exact chemical composition of my improved accelerator is not at present apparent, nor has any definite chemical name heretofore been applied to the substance which I have discovered. It is established, however, that the product is essentially different from the zinc salts of unoxidized dimethyl-dithio-carbamic acid, and also essentially different from the thiuram-disulphides which are obtained by oxidizing soluble salts of dimethyl-dithio-carbamic acid, both of which have already been used to some extent in the art as accelerators. These facts have been made evident because it has been found that vulcanization will take place, when my improved accelerator is used, at comparatively low temperatures and vulcanization will be spontaneously brought about at ordinary room or atmospheric temperatures in the vicinity of 20° C. for a period varying from several days to two weeks or more. This action of my improved accelerator is particularly advantageous when incorporated in compounds to be used as cements which cure spontaneously at ordinary temperatures or when used in connection with so-called sheeted or coated goods, such as rubber sheeting, etc. On the other hand, spontaneous vulcanization does not take place when the unoxidized zinc salt of dimethyl-dithio-carbamic acid is used or the thiuram-disulphides are used or when both are combined together.

Furthermore, my improved accelerator has been found to be non-poisonous and non-irritating to the skin or mucous membrane, and imparts no odor or color to the rubber compounds in which it is placed. It has also been found to be of very high power and greatly shortens the time consumed in curing the rubber compounds at usual steam pressures or temperatures, even when very small quantities of the accelerator are used.

When this oxidized product is used in the rubber compound, the following formulæ have been found efficacious:

| | |
|---|---|
| Rubber | 100 lbs. |
| Zinc oxide | 2 to 150 lbs. |
| Sulphur | 2 to 10 lbs. |
| Accelerator | 1/10 to 5/10 lbs. |

Depending upon the proportion of the ingredients used and the kind of stock it is desired to produce, the time of vulcanization varies from three minutes to thirty minutes at a temperature of about 280° F. If it be desired to cure the rubber at lower temperatures, it has been found that the stock will cure in from one to four hours at a temperature of 200° F. Even lower temperatures than this may be used when the time of vulcanization is prolonged, as above mentioned in connection with sheeted or coated goods.

As a compound suitable for such spontaneously cured articles the following is suggested:

Rubber 100 lbs.
Zinc oxide 50 lbs.
Commercial whiting 50 lbs.
Sulphur 5 lbs.
Accelerator 3/10 lb.

Having thus described this form of my invention, which I at present deem preferable, I do not wish to be understood as being limited to the specific proportions as indicated by the above formulæ, or to any fixed proportions of ingredients, for various other proportions and other ingredients may be used in the manufacture and use of my improved accelerator. For instance, instead of salts of zinc, those of cadmium and other metals which give insoluble compounds with dialkyl-dithio-carbamic acids may be used.

I do not wish to be limited to compounds derived from dimethylamine, but consider dimethylamine as a type of secondary amines and wish to include derivatives of other secondary amines, either alkyl, mixed alkyl-aryl, or cyclic, such for instance as diethylamine, methylaniline and piperidine.

What I claim and desire to protect by Letters Patent is:

1. The process of treating rubber or similar materials which comprises combining with the rubber compound the product obtained by oxidizing an insoluble metallic salt of a secondary amine, previously condensed with carbon bisulphide.

2. The process of treating rubber or similar materials which comprises combining with the rubber compound the product obtained by oxidizing a zinc salt of a secondary amine previously condensed with carbon bisulphide.

3. The process of treating rubber or similar materials which comprises combining with the rubber compound the product obtained by oxidizing the zinc salt of dimethylamine previously condensed with carbon bisulphide.

4. The process of treating rubber or similar materials which comprises combining it with a vulcanizing agent and the product obtained by oxidizing an insoluble metallic salt of an aryl or alkyl-substituted dithio-carbamic acid.

5. The process of treating rubber or similar materials which comprises combining it with a vulcanizing agent and the product obtained by oxidizing an insoluble metallic salt of dimethyl-dithio-carbamic acid.

6. The process of treating rubber or similar materials which comprises combining it with a vulcanizing agent and the product obtained by oxidizing the zinc salt of di-methyl-dithio-carbamic acid.

7. A vulcanized compound of rubber or similar material combined with a vulcanizing agent and the product obtained by oxidizing an insoluble metallic salt of an aryl or alkyl-substituted dithio-carbamic acid.

8. A vulcanized compound of rubber or similar material combined with a vulcanizing agent and the product obtained by oxidizing the zinc salt of an alkyl-substituted dithio-carbamic acid.

9. A vulcanized compound of rubber or similar material combined with a vulcanizing agent and the product obtained by oxidizing the zinc salt of dimethyl-dithio-carbamic acid.

PAUL I. MURRILL.